(12) United States Patent
Bammann et al.

(10) Patent No.: US 11,542,017 B2
(45) Date of Patent: Jan. 3, 2023

(54) AIRCRAFT AIR CONDITIONING SYSTEM WITH A CABIN EXHAUST AIR TURBINE

(71) Applicant: Airbus Operations GmbH, Hamburg (DE)

(72) Inventors: Holger Bammann, Hamburg (DE); Frank Klimpel, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 269 days.

(21) Appl. No.: 16/720,597

(22) Filed: Dec. 19, 2019

(65) Prior Publication Data

US 2020/0140096 A1    May 7, 2020

Related U.S. Application Data

(63) Continuation of application No. 15/347,974, filed on Nov. 10, 2016, now Pat. No. 10,543,925.

(30) Foreign Application Priority Data

Nov. 11, 2015 (DE) .......................... 102015222193.8

(51) Int. Cl.
*B64D 13/08* (2006.01)
*B64D 13/02* (2006.01)
(Continued)

(52) U.S. Cl.
CPC ............. *B64D 13/08* (2013.01); *B64D 13/02* (2013.01); *B64D 13/06* (2013.01); *F25B 9/004* (2013.01);
(Continued)

(58) Field of Classification Search
CPC .. B64D 13/06; B64D 13/08; B64D 2013/064; B64D 2013/0662
See application file for complete search history.

(56) References Cited

U.S. PATENT DOCUMENTS

| 4,434,624 A * | 3/1984 | Cronin | ................... | B64D 13/06 62/172 |
| 5,461,882 A * | 10/1995 | Zywiak | .............. | B60H 1/00007 62/401 |

(Continued)

FOREIGN PATENT DOCUMENTS

| CN | 101743166 A | 6/2010 |
| CN | 104276287 A | 1/2015 |

(Continued)

OTHER PUBLICATIONS

German Search Report, dated Oct. 13, 2016, priority document.

(Continued)

*Primary Examiner* — Christopher R Zerphey
(74) *Attorney, Agent, or Firm* — Greer, Burns & Crain, Ltd.

(57) ABSTRACT

An aircraft air conditioning system comprising an ambient air line, for ambient air to flow through, connected to supply ambient air to a mixer of the aircraft air conditioning system. An ambient air compressor is arranged in the ambient air line for compressing the ambient air flowing there through. A refrigerating apparatus comprises a refrigerant circuit for a refrigerant to flow through, including a refrigerant compressor arranged in the refrigerant circuit. The refrigerant circuit is coupled thermally to the ambient air line to transfer heat from the ambient air to the refrigerant before the ambient air is supplied to the mixer. A cabin exhaust air turbine is connected to a cabin exhaust air line, is coupled to the ambient air compressor arranged in the ambient air line, and is configured to expand the cabin exhaust air flowing through the cabin exhaust air line and to drive the ambient air compressor.

14 Claims, 1 Drawing Sheet

(51) Int. Cl.
  *B64D 13/06* (2006.01)
  *F25B 9/00* (2006.01)
  *F25B 9/10* (2006.01)

(52) U.S. Cl.
  CPC ........ *F25B 9/10* (2013.01); *B64D 2013/0618* (2013.01); *B64D 2013/0644* (2013.01); *B64D 2013/0648* (2013.01); *B64D 2013/0674* (2013.01); *B64D 2013/0688* (2013.01)

(56) References Cited

U.S. PATENT DOCUMENTS

| | | | |
|---|---|---|---|
| 5,956,960 A | 9/1999 | Niggeman | |
| 5,967,461 A | 10/1999 | Farrington | |
| 6,070,418 A * | 6/2000 | Crabtree | B64D 13/06 62/86 |
| 6,526,775 B1 * | 3/2003 | Asfia | B64D 13/06 62/402 |
| 6,595,010 B2 * | 7/2003 | Sauterleute | B01D 53/26 62/86 |
| 7,040,112 B2 * | 5/2006 | Axe | B64D 13/06 62/401 |
| 8,915,095 B2 * | 12/2014 | Bruno | B64D 13/06 62/333 |
| 9,676,484 B2 * | 6/2017 | Vaisman | F25B 1/10 |
| 10,059,457 B2 | 8/2018 | Klimpel et al. | |
| 10,543,925 B2 * | 1/2020 | Bammann | B64D 13/08 |
| 10,723,463 B1 * | 7/2020 | Plattner | B64D 13/06 |
| 2006/0231680 A1 | 10/2006 | Derouineau et al. | |
| 2008/0264084 A1 | 10/2008 | Derouineau et al. | |
| 2010/0323601 A1 * | 12/2010 | Cremers | B64D 13/06 454/76 |
| 2014/0144163 A1 * | 5/2014 | Klimpel | B64D 13/08 62/89 |
| 2015/0013355 A1 | 1/2015 | Klimpel et al. | |
| 2015/0307195 A1 | 10/2015 | Bruno | |
| 2015/0307196 A1 | 10/2015 | Bruno | |

FOREIGN PATENT DOCUMENTS

| | | |
|---|---|---|
| DE | 69502501 | 9/1998 |
| DE | 102007032306 | 1/2009 |
| EP | 0888966 A2 | 1/1999 |
| EP | 2735510 | 5/2014 |
| EP | 2821346 | 1/2015 |
| EP | 2937287 A1 | 10/2015 |
| WO | 9912810 | 3/1999 |
| WO | 2009007094 A2 | 1/2009 |

OTHER PUBLICATIONS

European Search Report for corresponding EP Application No. 18200783.1.
Chinese Office Action, priority document.

* cited by examiner

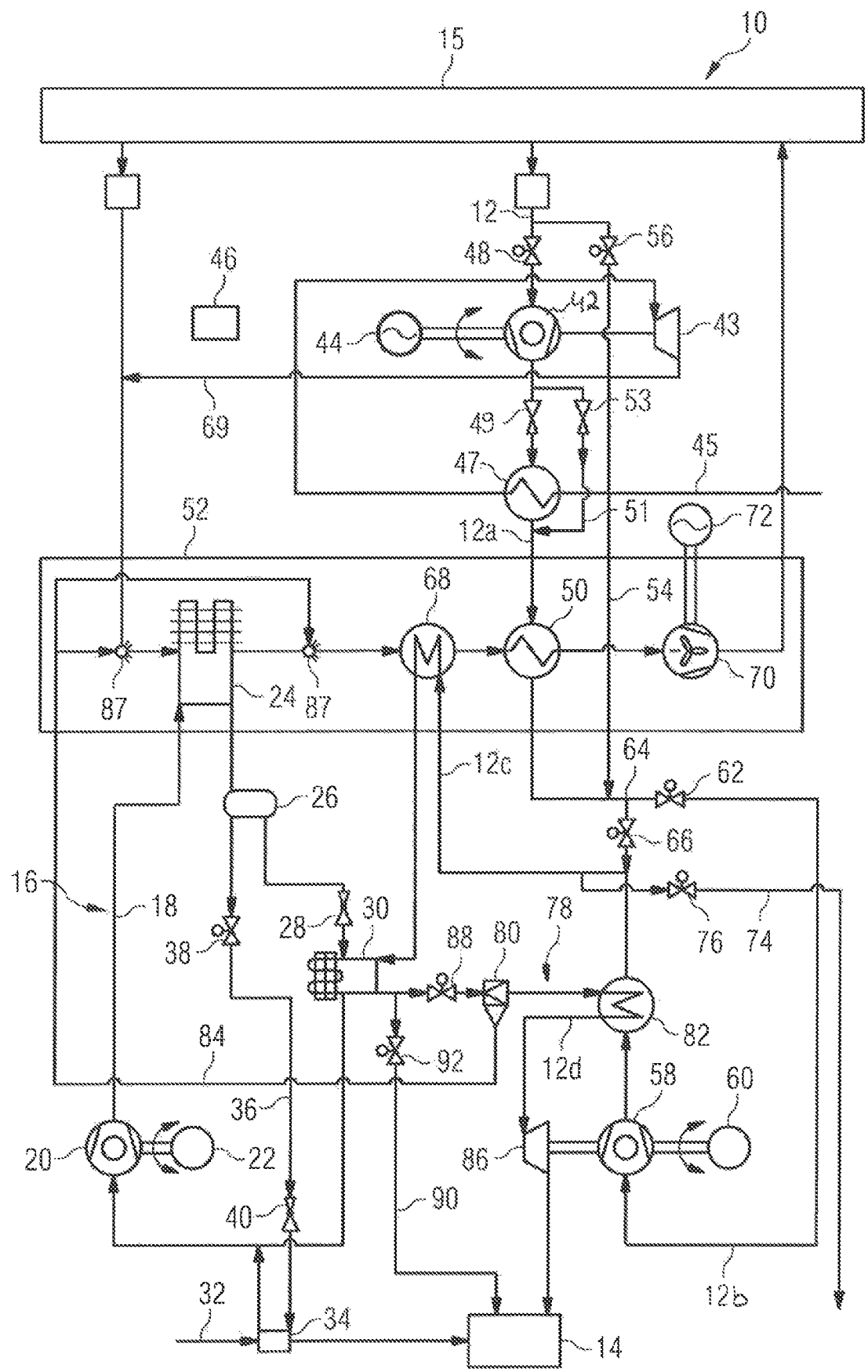

AIRCRAFT AIR CONDITIONING SYSTEM WITH A CABIN EXHAUST AIR TURBINE

CROSS-REFERENCES TO RELATED APPLICATIONS

This is a continuation application of co-pending U.S. patent application Ser. No. 15/347,974 filed on Nov. 10, 2016, which claimed the benefit of the German patent application No. 10 2015 222 193.8 filed on Nov. 11, 2015, the entire disclosures of which are incorporated herein by way of reference.

BACKGROUND OF THE INVENTION

The invention relates to an aircraft air conditioning system and a method for operating an aircraft air conditioning system.

An aircraft air conditioning system is used to adjust and maintain a desired pressure, a desired temperature and a desired air humidity in an aircraft cabin. Furthermore, the aircraft air conditioning system supplies adequate fresh air to the aircraft cabin to ensure that a prescribed minimum amount of fresh air is present in the aircraft cabin. From EP 2 735 510 A1 and US 2014/0144163 A1 an aircraft air conditioning system is known in which a refrigerating apparatus operated using a two-phase refrigerant is used to cool ambient air compressed by a multistage compressor. The refrigerating apparatus comprises a refrigerant circuit, arranged in which are a compressor, a condenser, an expansion valve and an evaporator, through which ambient air that is to be cooled flows. Bleed air taken from an engine or an auxiliary engine of the aircraft is used to drive the compressor of the refrigerating apparatus and to drive the multistage compressor for compressing the ambient air.

SUMMARY OF THE INVENTION

An object of the invention is to provide an aircraft air conditioning system that enables energy-efficient air conditioning of an aircraft cabin. The object of the invention is also to specify a method for operating such an aircraft air conditioning system.

An aircraft air conditioning system comprises an ambient air line, adapted to have ambient air flow through it and being connected to a mixer of the aircraft air conditioning system, in order to supply ambient air taken from an aircraft environment to the mixer. The mixer connected to the ambient air line may be a premixer or a main mixer of the aircraft air conditioning system, to which recirculation air, taken away from an aircraft cabin that is to be air conditioned by the air conditioning system, is supplied in addition to the ambient air from the ambient air line. In the mixer, the ambient air from the ambient air line is mixed with the recirculation air taken away from the aircraft cabin. The mixed air produced in the mixer is finally used to air condition the aircraft cabin.

The aircraft air conditioning system further comprises at least one ambient air compressor arranged in the ambient air line for compressing the ambient air flowing through the ambient air line. A refrigerating apparatus of the aircraft air conditioning system comprises a refrigerant circuit adapted to have a refrigerant flow through it, as well as a refrigerant compressor arranged in the refrigerant circuit. The refrigerant circuit is preferably coupled thermally to the ambient air line via a heat exchanger in the form of an evaporator, for example, in order to transfer heat from the ambient air flowing through the ambient air line to the refrigerant circulating in the refrigerant circuit before the ambient air is supplied to the mixer. In the aircraft air conditioning system, an air conditioning process consequently takes place in which the ambient air is first compressed by the ambient air compressor and then cooled to a desired temperature by the transfer of heat to the refrigerant circulating in the refrigerant circuit of the refrigerating apparatus. The efficiency of this air conditioning process can be controlled as required by appropriate precompression of the ambient air in the ambient air compressor.

Finally, the aircraft air conditioning system comprises a cabin exhaust air turbine, which is connected to a cabin exhaust air line and coupled to the at least one ambient air compressor arranged in the ambient air line. The cabin exhaust air turbine is configured to expand the cabin exhaust air flowing through the cabin exhaust air line and to drive the at least one ambient air compressor arranged in the ambient air line. In the aircraft air conditioning system, the pressure of the exhaust air taken away from an aircraft cabin, which pressure exceeds the ambient pressure outside the aircraft above a certain flight altitude in flight mode of an aircraft equipped with the aircraft air conditioning system, is thus used for energy recovery. The energy recovered from the cabin exhaust air is used to drive the at least one ambient air compressor. The energy consumption of a compressor drive executed in the form of an electric motor, for example, can be reduced by this recovered energy.

The ambient air line may comprise a first section, in which a first ambient air compressor is arranged for compressing the ambient air flowing through the first section of the ambient air line. In the first section of the ambient air line, a first valve may be arranged that may be configured to control the ambient air flow through the first section of the ambient air line. The cabin exhaust air turbine is preferably coupled to the first ambient air compressor and is configured to drive the first ambient air compressor. This facilitates a reduction in the power of a drive of the first ambient air compressor, which drive is formed, in particular, in the form of an electric motor.

A post-heater that is coupled thermally to the cabin exhaust air line upstream of the cabin exhaust air turbine may be arranged in the first section of the ambient air line downstream of the first ambient air compressor. The terms "downstream" and "upstream" refer here to the flow direction of the ambient air through the first section of the ambient air line and the flow direction of the cabin exhaust air through the cabin exhaust air line. The post-heater is preferably configured to transfer heat from the ambient air flowing through the ambient air line downstream of the first ambient air compressor to the cabin exhaust air flowing through the cabin exhaust air line upstream of the cabin exhaust air turbine. The temperature of the cabin exhaust air entering the cabin exhaust air turbine can be increased by the post-heater and outputs of the cabin exhaust air turbine can consequently be increased.

A post-heater bypass line may branch off from the first section of the ambient air line upstream of the post-heater and open into the first section of the ambient air line again downstream of the post-heater. The terms "upstream" and "downstream" refer here to the flow direction of the ambient air through the ambient air line. Arranged in the post-heater bypass line is preferably a post-heater bypass valve, which is configured to control the ambient air flow through the post-heater bypass line. The ambient air flowing through the first section of the ambient air line downstream of the first ambient air compressor can then be conducted optionally either through the post-heater or through the post-heater bypass line. A selective operation of the post-heater makes it possible to control the temperature of the cabin exhaust air emerging from the cabin exhaust air turbine. The overall efficiency of the system can be optimized by this and undesirable effects, such as the formation of ice at an output of the cabin exhaust air turbine, for example, can be avoided.

A turbine exhaust air line connected to an outlet of the cabin exhaust air turbine preferably opens into a ram air duct. A condenser of the refrigerating apparatus and/or at least one precooler, for example, may be arranged in the ram air duct. The cabin exhaust air conducted into the ram air duct can be used to cool the condenser and/or the at least one precooler. Due to this, the ram air requirement of the aircraft air conditioning system and consequently the aerodynamic resistance caused by the supply of ram air to the aircraft air conditioning system can be reduced. This enables a reduction in the fuel consumption of the aircraft.

The aircraft air conditioning system may further comprise a control device, which is configured to control the operation of the cabin exhaust air turbine depending on a difference between a pressure of the cabin exhaust air and a pressure of the ambient air supplied to the aircraft air conditioning system from the aircraft environment via the ambient air line. The control device is preferably configured to control the operation of the cabin exhaust air turbine in such a way that the cabin exhaust air turbine is only operated if the pressure of the cabin exhaust air is higher than the pressure of the ambient air supplied to the aircraft air conditioning system from the aircraft environment via the ambient air line. In particular, the control device may be configured to control the operation of the cabin exhaust air turbine depending on the flight altitude of an aircraft equipped with the aircraft air conditioning system.

For example, the control device may operate the cabin exhaust air turbine when the aircraft is flying at a predetermined minimum flight altitude, at which the ambient pressure, which is reduced compared with the normal atmospheric pressure at sea level, is lower than the pressure of the exhaust air taken away from the aircraft cabin. The control device is preferably configured to operate the cabin exhaust air turbine when an aircraft equipped with the aircraft air conditioning system is flying at an altitude of at least 6000 m.

In a method for operating an aircraft air conditioning system, ambient air is conducted through an ambient air line, which is connected to a mixer of the aircraft air conditioning system, in order to supply ambient air to the mixer. The ambient air flowing through the ambient air line is compressed in at least one ambient air compressor arranged in the ambient air line. A refrigerating apparatus is provided, which comprises a refrigerant circuit adapted to have a refrigerant flow through the refrigerant circuit, as well as a refrigerant compressor arranged in the refrigerant circuit. The refrigerant circuit of the refrigerating apparatus is coupled thermally to the ambient air line, in order to transfer heat from the ambient air flowing through the ambient air line to the refrigerant circulating in the refrigerant circuit before the ambient air is supplied to the mixer. A cabin exhaust air turbine, which is connected to a cabin exhaust air line and is coupled to the at least one ambient air compressor arranged in the ambient air line, expands the cabin exhaust air flowing through the cabin exhaust air line and drives the at least one ambient air compressor arranged in the ambient air line.

The ambient air line preferably comprises a first section, in which a first ambient air compressor is arranged for compressing the ambient air flowing through the first section of the ambient air line. The cabin exhaust air turbine may be coupled to the first ambient air compressor and drive the first ambient air compressor.

In the first section of the ambient air line, a post-heater may be arranged downstream of the first ambient air compressor and is coupled thermally to the cabin exhaust air line upstream of the cabin exhaust air turbine, and transfers heat from the ambient air flowing through the ambient air line downstream of the first ambient air compressor to the cabin exhaust air flowing through the cabin exhaust air line upstream of the cabin exhaust air turbine.

A post-heater bypass line may branch off from the first section of the ambient air line upstream of the post-heater and open into the first section of the ambient air line again downstream of the post-heater. Arranged in the post-heater bypass line is preferably a post-heater bypass valve, which controls the flow of ambient air through the post-heater bypass line.

Turbine exhaust air, which flows through a turbine exhaust air line connected to an outlet of the cabin exhaust air turbine, can be conducted into a ram air duct.

The operation of the cabin exhaust air turbine is preferably controlled depending on the flight altitude of an aircraft equipped with the aircraft air conditioning system.

The cabin exhaust air turbine is preferably operated when an aircraft equipped with the aircraft air conditioning system is flying at a flight altitude of at least 6000 m.

BRIEF DESCRIPTION OF THE DRAWINGS

A preferred embodiment of the invention is now explained in greater detail with reference to the enclosed schematic drawing, in which The FIGURE shows an air conditioning system for air conditioning an aircraft cabin.

DETAILED DESCRIPTION OF THE PREFERRED EMBODIMENTS

An aircraft air conditioning system 10 illustrated in the FIGURE comprises an ambient air line 12, through which ambient air can flow and which is connected to a mixer 14 of the aircraft air conditioning system 10, in order to supply ambient air taken from an aircraft environment 15 to the mixer 14. In the mixer 14, the ambient air from the ambient air line 12 is mixed with recirculation air taken from an aircraft cabin. The mixed air produced in the mixer 14 is finally used to air condition the aircraft cabin.

The aircraft air conditioning system 10 is equipped with a refrigerating apparatus 16, which comprises a refrigerant circuit 18, through which a two-phase refrigerant flows, for example R134A ($CH_2F$—$CF_3$), $CO_2$ or R245fa (1,1,1,3,3-pentafluoropropane), and a refrigerant compressor 20 arranged in the refrigerant circuit 18. The refrigerant compressor 20 is driven by a first electric motor 22. The refrigerant circuit 18 is coupled thermally to the ambient air line, in order to transfer heat from the ambient air flowing through the ambient air line 12 to the refrigerant circulating in the refrigerant circuit 18 before the ambient air is supplied to the mixer 14. Arranged in the refrigerant circuit 18 in addition to the refrigerant compressor 20 are a condenser 24, a refrigerant collector 26, an expansion valve 28 and an evaporator 30, which couples the refrigerant circuit 18 thermally to the ambient air line 12.

The refrigerant circuit 18 of the refrigerating apparatus 16 is also coupled thermally to a recirculation air line 32, through which recirculation air flows and which is connected to the mixer 14 of the aircraft air conditioning system 10, in order to transfer heat from the recirculation air flowing through the recirculation air line 32 to the refrigerant flowing through the refrigerant circuit 18. The thermal coupling between the refrigerant circuit 18 and the recirculation air line 32 is realized by another evaporator 34, which is arranged in a connection line 36 branching off from the refrigerant collector 26 arranged in the refrigerant circuit 18. The refrigerant flow through the connection line 36 is controlled by a control valve 38 arranged in the connection line 36. Another expansion valve 40 is also arranged in the connection line 36 upstream of the other evaporator 34 with reference to the flow direction of the refrigerant through the refrigerant circuit 18. The pressure and the temperature of the refrigerant flowing through the connection line 36 can be adjusted as desired by the other expansion valve 40 before the refrigerant is conducted into the other evaporator 34.

In the aircraft air conditioning system 10 the refrigerating apparatus 16 is thus used not only for cooling the ambient air flowing through the ambient air line 12, but also for cooling recirculation air taken away from the aircraft cabin to be air conditioned. Before it is supplied to the mixer 14 of the aircraft air conditioning system 10, the recirculation air can therefore be cooled to the same low temperature as the ambient air flowing through the ambient air line 12. Cooling of the ambient air to a temperature that lies below a desired target cabin supply air temperature by the transfer of heat to the refrigerant circulating in the refrigerant circuit 18 of the refrigerating apparatus 16 can consequently be eliminated. Furthermore, operation of the refrigerating apparatus 16 at relatively high minimal refrigerant temperatures is made possible.

The ambient air line 12 comprises a first section 12a, in which a first ambient air compressor 42 is arranged for compressing the ambient air flowing through the first section 12a of the ambient air line 12. The speed-controlled first ambient air compressor 42 is driven by a second electric motor 44. The first ambient air compressor 42 is controlled by a control device 46 of the aircraft air conditioning system 10 in such a way that it compresses the ambient air flowing through the first section 12a of the ambient air line 12 to the target cabin pressure in the aircraft cabin to be air conditioned. Also arranged in the first section 12a of the ambient air line 12 is a first valve 48 for controlling the ambient air flow through the first section 12a of the ambient air line 12.

Coupled to the first ambient air compressor 42 is a cabin exhaust air turbine 43, which is connected to a cabin exhaust air line 45. In particular, the first ambient air compressor 42 and the cabin exhaust air turbine 43 are arranged on a common shaft. In operation the cabin exhaust air turbine 43 expands the cabin exhaust air flowing through the cabin exhaust air line and drives the first ambient air compressor 42. Due to this, the pressure of the exhaust air taken away from an aircraft cabin, which pressure exceeds the ambient pressure outside the aircraft above a certain flight altitude in flight mode of an aircraft equipped with the aircraft air conditioning system 10, can be used for energy recovery. The energy recovered from the cabin exhaust air is used to drive the first ambient air compressor 42. The energy consumption of the second electric motor 44 can be reduced by this.

The control device 46 of the aircraft air conditioning system 10 controls the operation of the cabin exhaust air turbine 43 depending on a difference between a pressure of the cabin exhaust air and a pressure of the ambient air supplied to the aircraft air conditioning system 10 from the aircraft environment via the ambient air line 12. In particular, the control device 46 controls the operation of the cabin exhaust air turbine 43 in such a way that the cabin exhaust air turbine 43 is only operated if the pressure of the cabin exhaust air is higher than the pressure of the ambient air supplied to the aircraft air conditioning system 10 from the aircraft environment via the ambient air line 12. Especially simple control of the operation of the cabin exhaust air turbine 43 is possible if the control device 46 controls the operation of the cabin exhaust air turbine in dependence on the flight altitude of an aircraft equipped with the aircraft air conditioning system 10 and only starts operation of the cabin exhaust air turbine, for example, when the aircraft is flying at a predetermined minimum flight altitude of 6000 m, for example, at which the ambient pressure, which is reduced compared with the normal atmospheric pressure at sea level, is lower than the pressure of the exhaust air taken away from the aircraft cabin.

In the first section 12a of the ambient air line 12, a post-heater 47 is arranged downstream of the first ambient air compressor 42 and coupled thermally to the cabin exhaust air line 45 upstream of the cabin exhaust air turbine 43. The terms "downstream" and "upstream" refer here to the flow direction of the ambient air through the first section 12a of the ambient air line 12 and the flow direction of the cabin exhaust air through the cabin exhaust air line 45. In operation the post-heater 47 transfers heat from the ambient air flowing through the ambient air line 12 downstream of the first ambient air compressor 42 to the cabin exhaust air flowing through the cabin exhaust air line 45 upstream of the cabin exhaust air turbine 43. The supply of ambient air, which flows through the first section 12a of the ambient air line 12 downstream of the first ambient air compressor 42, to the post-heater 47 is controlled by a post-heater valve 49 arranged in the first section 12a of the ambient air line 12 upstream of the post-heater 47.

A post-heater bypass line 51 branches off downstream of the first ambient air compressor 42 and upstream of the post-heater 47 from the first section of the ambient air line and opens into the first section 12a of the ambient air line 12 again downstream of the post-heater 47. The terms "upstream" and "downstream" refer here in turn to the flow direction of the ambient air through the ambient air line 12. Arranged in the post-heater bypass line 51 is a post-heater bypass valve 53, which controls the ambient air flow through the post-heater bypass line 51. Due to suitable control of the post-heater valve 49 and the post-heater bypass valve 53 by the control device 46, the ambient air flowing through the first section 12a of the ambient air line 12 downstream of the first ambient air compressor 42 can be conducted optionally either through the post-heater 47 or through the post-heater bypass line 51. Selective operation of the post-heater 47 and consequently control of the temperature of the cabin exhaust air emerging from the cabin exhaust air turbine 43 is made possible by this.

A first precooler 50 is also arranged in the first section 12a of the ambient air line 12 for precooling of ambient air compressed by the first ambient air compressor 42. The first precooler 50 is arranged in a ram air duct 52 and ram air conducted through the ram air duct 52 flows through it in operation of the aircraft air conditioning system 10. The ambient air, which was heated by the compression in the first ambient air compressor 42, is cooled again to a desired lower temperature in the first precooler 50.

A first bypass line 54 runs parallel to the first section 12a of the ambient air line 12. A second valve 56 arranged in the first bypass line 54 serves to control the ambient air flow through the first bypass line 54. Ambient air that flows through the first bypass line 54 is conducted past the first section 12a of the ambient air line 12 and consequently past the first ambient air compressor 42 and the first precooler 50.

The ambient air line 12 further comprises a second section 12b which, relative to the flow direction of the ambient air through the ambient air line 12, is arranged downstream of the first section 12a of the ambient air line 12 and the first bypass line 54. The ambient air supplied to the second section 12b of the ambient air line 12 can consequently be conducted from the first section 12a of the ambient air line 12 or the first bypass line 54 into the second section 12b of the ambient air line 12. A second ambient air compressor 58 for compressing the ambient air flowing through the second section 12b of the ambient air line 12 is arranged in the second section 12b of the ambient air line 12, wherein precompressed ambient air from the first ambient air compressor 42 or untreated ambient air from the first bypass line 54 can be supplied to the second ambient air compressor 58. The speed-controlled second ambient air compressor 58 is driven by a third electric motor 60.

The second ambient air compressor 58 is controlled by the control device 46 of the aircraft air conditioning system 10 in such a way that it compresses the ambient air flowing through the second section 12b of the ambient air line 12 to a pressure that is greater than the target cabin pressure in the aircraft cabin to be air conditioned. However, the operation of the first and the second ambient air compressor 42, 58 is controlled such that the temperature of the compressed ambient air does not exceed a maximum temperature of, for example, 160° C. A third valve 62 arranged in the second section 12b of the ambient air line 12 is used to control the ambient air flow through the second section 12b of the ambient air line 12.

The aircraft air conditioning system 10 further comprises a second bypass line 64, which runs parallel to the second section 12b of the ambient air line 12. In the second bypass line 64 a fourth valve 66 is arranged, which controls the flow of ambient air through the second bypass line 64. Ambient air that flows through the second bypass line 64 is conducted past the second section 12b of the ambient air line 12 and consequently past the second ambient air compressor 58.

The ambient air line 12 further comprises a third section 12c which, relative to the flow direction of the ambient air through the ambient air line 12, is arranged downstream of the second section 12b of the ambient air line and the second bypass line 64. The ambient air supplied to the third section 12c of the ambient air line 12 can consequently be conducted from the second section 12b of the ambient air line 12 or via the second bypass line 64, circumventing the second section 12b of the ambient air line 12, from the first section 12a of the ambient air line 12 into the third section 12c of the ambient air line 12. The third section 12c of the ambient air line 12 is coupled thermally to the refrigerant circuit 18 via the evaporator 30 arranged in the refrigerant circuit 18 of the refrigerating apparatus 16. Cooling of the ambient air in the ambient air line 12 by heat transfer to the refrigerant circulating in the refrigerant circuit 18 of the refrigerating apparatus 16 accordingly takes place when it flows through the third section 12c of the ambient air line 12.

A second precooler 68 is arranged in the third section 12c of the ambient air line 12 for precooling ambient air before the creation of the thermal coupling between the third section 12c of the ambient air line 12 and the refrigerant circuit 18 of the refrigerating apparatus 16. The second precooler 68 is arranged in the ram air duct 52 upstream of the first precooler 50 relative to the flow direction of the ram air through the ram air duct and, as with the first precooler 50, ram air conducted through the ram air duct 52 flows through it when the aircraft air conditioning system 10 is in operation.

In addition to the first and the second precooler 50, 68, the condenser 24 of the refrigerating apparatus 16 is also arranged in the ram air duct 52, wherein the condenser 24 is positioned upstream of the second precooler 68 in the ram air duct 52 relative to the flow direction of the ram air through the ram air duct 52. A turbine exhaust air line 69 connected to an outlet of the cabin exhaust air turbine 43 opens into the ram air duct 52. The cabin exhaust air expanded in the cabin exhaust air turbine 43 can be conducted by this into the ram air duct 52 and used there for cooling the condenser 24 and the first and the second precooler 50, 68. In order to ensure that ram air flows properly through the ram air duct 52 even in ground operation of an aircraft equipped with the aircraft air conditioning system 10, a fan 70 is also arranged in the ram air duct 52 to convey ram air through the ram air duct 52. The fan 70 is driven by a fourth electric motor 72.

A trim air line 74 branches off from the third section 12c of the ambient air line 12 upstream of the second precooler 68 relative to the flow direction of the ambient air through the ambient air line 12. The trim air flow through the trim air line 74 is controlled by a trim air valve 76 arranged in the trim air line 74.

The ambient air line 12 of the aircraft air conditioning system 10 further comprises a fourth section 12d, which is arranged downstream of the third section 12c of the ambient air line 12 relative to the flow direction of the ambient air through the ambient air line 12. Arranged in the fourth section 12d of the ambient air line 12 is a water separation device 78, which comprises a water trap 80 and a reheater 82. On flowing through the water trap 80, the ambient air is dehumidified to such an extent that it is ensured that not too much humidity is supplied to the aircraft cabin to be air conditioned. Water separated from the ambient air in the water trap 80 is conducted via a drainage line 84 into the ram air duct 52 and injected into the ram air duct 52 via a water injection nozzle 87. The water evaporates in part and cools the ram air flowing through the ram air duct 52.

A turbine 86 for expanding the ambient air flowing through the fourth section 12d of the ambient air line 12 is also arranged in the fourth section 12d of the ambient air line 12. The turbine 86 is arranged on a common shaft with the second ambient air compressor 58 arranged in the second section 12b of the ambient air line 12. The reheater 82 arranged downstream of the water trap 80 relative to the flow direction of the ambient air through the ambient air line 12 is used to heat ambient air flowing through the fourth section 12d of the ambient air line 12 before it is supplied to the turbine 86 and creates a thermal coupling between the fourth section 12d of the ambient air line 12 and the second section 12b of the ambient air line 12. The reheater 82 thereby brings warm ambient air flowing through the second section 12b of the ambient air line 12 following its compression in the second ambient air compressor 58 into thermal contact with the ambient air flowing through the fourth section 12d of the ambient air line 12 before it is supplied to the turbine 86. The water droplets remaining in the ambient air flow after it flows through the water trap 80 are evaporated in the reheater 82 to protect the turbine 86 from damage due to droplet impact or cavitation. Furthermore, the reheater 82 increases the power output of the turbine 86.

Finally, a fifth valve 88 for controlling the ambient air flow through the fourth section 12d of the ambient air line 12 is arranged in the fourth section 12d of the ambient air line 12.

The aircraft air conditioning system 10 further comprises a third bypass line 90, which runs parallel to the fourth section 12d of the ambient air line 12. A sixth valve 92 for controlling the ambient air flow through the third bypass line 90 is arranged in the third bypass line 90. Ambient air which flows through the third bypass line 90 is conducted past the fourth section 12d of the ambient air line 12 and consequently past the water separation device 78 and the turbine 86.

In interaction with an ambient air compressor 42, 58, in particular the second ambient air compressor 58, which compresses the ambient air flowing through the second section 12b of the ambient air line 12 to a pressure that is greater than the target cabin pressure in the aircraft cabin to be air conditioned, the turbine 86 arranged in the fourth section 12d of the ambient air line 12 facilitates the realization of a cold air process, in which the ambient air flowing through the ambient air line 12 is first compressed and then expanded again and cooled in the process. By compressing the ambient air to a pressure lying above the target cabin pressure, it is made possible the removal of excess water from the ambient air flow in the water separation device 78 arranged in the fourth section 12d of the ambient air line 12. The ambient air is cooled to a desired low temperature by expansion of the ambient air in the turbine 86 before it is supplied to the mixer of the aircraft air conditioning system.

According to the requirement, either exclusively the cold vapor process running in the refrigerating apparatus 16 or both the cold vapor process and the cold air process can be used in the aircraft air conditioning system for conditioning and cooling the ambient air flowing through the ambient air line 12. Operation of the aircraft air conditioning system with exclusive use of the cold vapor process is appropriate, in particular, in operating phases of the aircraft air conditioning system 10 in which the ambient air flowing through the ambient air line has only a low moisture content. Operation of the aircraft air conditioning system 10 using both the cold vapor process and the cold air process makes sense, in particular, if the ambient air flowing through the ambient air line 12 has to be dehumidified before being supplied to the mixer 14 of the aircraft air conditioning system 10.

Finally, even operation of the aircraft air conditioning system 10 with exclusive use of the cold air process is possible by switching off the refrigerating apparatus 16. This makes sense if the aircraft cabin is to be heated by the aircraft air conditioning system 10. Operation of the aircraft air conditioning system 10 with exclusive use of the cold air process is also possible as an emergency mode in the event of failure of the refrigerating apparatus 16. In an emergency mode of this kind, both ambient air compressors 42, 58 can be used to compress the ambient air flowing through the ambient air line 12, due to which it is possible to provide the aircraft cabin with an adequate amount of conditioned and cooled ambient air even if an air conditioning unit fails completely in an aircraft air conditioning system 10 equipped with two air conditioning units and in addition the refrigerating apparatus of the second air conditioning unit is no longer functional.

The control device 46 controls the operation of the aircraft air conditioning system 10 in such a way that in ground operation of an aircraft equipped with the aircraft air conditioning system 10, the ambient air is conducted first through the first bypass line 54, then through the second section 12b of the ambient air line 12, then through the third section 12c of the ambient air line 12 and finally through the fourth section 12d of the ambient air line 12. In ground operation of an aircraft equipped with the aircraft air conditioning system 10, the ambient air is thus compressed on flowing through the second ambient air compressor 58 to a pressure lying above the target cabin pressure, which pressure facilitates a dehumidification of the ambient air in the water separation device 78. The first ambient air compressor 42, on the other hand, is circumvented. The cooling of the ambient air is achieved both by the transfer of heat to the refrigerant circuit 18 of the refrigerating apparatus 16 and by the expansion of the ambient air in the turbine 86.

In climbing or descent mode of an aircraft equipped with the aircraft air conditioning system 10, the control device 46 controls the ambient air flow through the ambient air line 12 in such a way, on the other hand, that the ambient air is conducted first through the first section 12a of the ambient air line 12, then through the second section 12b of the ambient air line 12, then through the third section 12c of the ambient air line 12 and finally through the fourth section 12d of the ambient air line 12. In climbing or descent mode of an aircraft equipped with the aircraft air conditioning system 10, the first ambient air compressor 42 and the second ambient air compressor 58 are thus connected in series in order to compress the ambient air flowing through the ambient air line 12 to a pressure that then permits dehumidification of the ambient air in the water separation device 78 even when the efficiency of the water trap 80 decreases. By connecting the ambient air compressors 42, 58 in series, both ambient air compressors 42, 58 can be operated in their optimal range even in the event of high power demands. As in ground operation, the ambient air is cooled both by the transfer of heat to the refrigerant circuit 18 of the refrigerating apparatus 16 and by the expansion of the ambient air in the turbine 86.

In cruising mode of an aircraft equipped with the aircraft air conditioning system 10, the control device 46 finally controls the ambient air flow through the ambient air line 12 in such a way that the ambient air is conducted first through the first section 12a of the ambient air line 12, then through the second bypass line 64, then through the third section 12c of the ambient air line 12 and finally through the third bypass line 90. In cruising mode of an aircraft equipped with the aircraft air conditioning system 10, the ambient air flowing through the ambient air line 12 is thus compressed exclusively by the first ambient air compressor 42 to the target cabin pressure, since dehumidification of the very dry ambient air at cruising altitude of an aircraft is not necessary. The second ambient air compressor 58 is accordingly circumvented, as are the water separation device 78 and the turbine 86. The ambient air is cooled exclusively by the transfer of heat to the refrigerant circuit 18 of the refrigerating apparatus 16.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. An aircraft air conditioning system with:
a mixer,
a recirculation air line connected to the mixer, wherein recirculation air taken from an aircraft cabin flows through the recirculation air line to the mixer,
an ambient air line configured to be flown through with ambient air and being connected to the mixer, in order to supply ambient air to the mixer,
a first ambient air compressor and a second ambient air compressor, each arranged in the ambient air line for compressing the ambient air flowing through the ambient air line,
a refrigerating apparatus, which comprises a refrigerant circuit configured to be flown through with a refrigerant as well as a refrigerant compressor arranged in the refrigerant circuit, wherein the refrigerant circuit is coupled thermally to the ambient air line, in order to transfer heat from the ambient air flowing through the ambient air line to the refrigerant circulating in the refrigerant circuit before the ambient air is supplied to the mixer,
a cabin exhaust air line, and
a cabin exhaust air turbine, which is connected to the cabin exhaust air line and is coupled to the first ambient air compressor arranged in the ambient air line and is configured to expand the cabin exhaust air flowing through the cabin exhaust air line and to drive the first ambient air compressor arranged in the ambient air line,
wherein the refrigerating apparatus further comprises a first evaporator, which is configured to thermally couple the refrigerant circuit and the recirculation air line, in order to transfer heat from the recirculation air flowing through the recirculation air line to the refrigerant flowing through the refrigerant circuit,
wherein the mixer receives a first flow of the recirculation air via the first evaporator, a second flow of a bypass ambient air via a second evaporator of the refrigerating apparatus, and a third flow via a second turbine arranged on a common shaft with the second ambient air compressor, and
wherein the first ambient air compressor receives a non-compressed ambient air flow, and the second ambient air compressor is downstream from the first ambient air compressor and receives ambient air flow downstream from a ram air duct.

2. The aircraft air conditioning system according to claim 1, wherein the ambient air line comprises a first section, in which the first ambient air compressor is arranged for compressing the ambient air flowing through the first section of the ambient air line, and in that the cabin exhaust air turbine is coupled to the first ambient air compressor and is configured to drive the first ambient air compressor.

3. The aircraft air conditioning system according to claim 2, wherein a post-heater is arranged in the first section of the ambient air line downstream of the first ambient air compressor and is coupled thermally to the cabin exhaust air line upstream of the cabin exhaust air turbine, which post-heater is configured to transfer heat from the ambient air flowing through the ambient air line downstream of the first ambient air compressor to the cabin exhaust air flowing through the cabin exhaust air line upstream of the cabin exhaust air turbine.

4. The aircraft air conditioning system according to claim 3, further comprising a post-heater bypass line, which branches off from the first section of the ambient air line upstream of the post-heater and opens into the first section of the ambient air line again downstream of the post-heater, wherein a post-heater bypass valve is preferably arranged in the post-heater bypass line, which post-heater bypass valve is configured to control the ambient air flow through the post-heater bypass line.

5. The aircraft air conditioning system according to claim 1, wherein a turbine exhaust air line connected to an outlet of the cabin exhaust air turbine opens into the ram air duct.

6. The aircraft air conditioning system according to claim 1, further comprising a controller, which is configured to control the operation of the cabin exhaust air turbine in dependence on the flight altitude of an aircraft equipped with the aircraft air conditioning system.

7. The aircraft air conditioning system according to claim 6, wherein the controller is configured to operate the cabin exhaust air turbine when an aircraft equipped with the aircraft air conditioning system is flying at a flight altitude of at least 6000 m.

8. A method for operating an aircraft air conditioning system
conducting ambient air through an ambient air line, which is connected to a mixer of the aircraft air conditioning system, in order to supply ambient air to the mixer,
compressing the ambient air flowing through the ambient air line in a first ambient air compressor and a second ambient air compressor arranged in the ambient air line, wherein the first ambient air compressor receives a non-compressed ambient air flow, and the second ambient air compressor is downstream from the first ambient air compressor and receives ambient air flow downstream from a ram air duct,
providing a refrigerating apparatus, which comprises a refrigerant circuit configured to be flown through with a refrigerant as well as a refrigerant compressor arranged in the refrigerant circuit,
thermal coupling of the refrigerant circuit of the refrigerating apparatus to the ambient air line, in order to transfer heat from the ambient air flowing through the ambient air line to the refrigerant circulating in the refrigerant circuit before the ambient air is supplied to the mixer,
characterised by
providing a cabin exhaust air turbine, which is connected to a cabin exhaust air line and is coupled to the first ambient air compressor arranged in the ambient air line, expands the cabin exhaust air flowing through the cabin exhaust air line and drives the first ambient air compressor arranged in the ambient air line,
connecting the mixer to a recirculation air line, through which recirculation air taken from an aircraft cabin flows to the mixer, and
thermal coupling the refrigerant circuit and the recirculation air line by a first evaporator of the refrigerating apparatus, in order to transfer heat from the recirculation air flowing through the recirculation air line to the refrigerant flowing through the refrigerant circuit,
wherein the mixer receives a first flow of the recirculation air via the first evaporator, a second flow of a bypass ambient air via a second evaporator of the refrigerating apparatus, and a third flow via a second turbine arranged on a common shaft with the second ambient air compressor.

9. The method according to claim 8, wherein the ambient air line comprises a first section, in which the first ambient air compressor of the first section is arranged for compressing the ambient air flowing through the first section of the ambient air line, and in that the cabin exhaust air turbine is coupled to the first ambient air compressor and drives the first ambient air compressor.

10. The method according to claim 9, wherein in the first section of the ambient air line downstream of the first ambient air compressor, a post-heater is arranged, which is coupled thermally to the cabin exhaust air line upstream of the cabin exhaust air turbine and transfers heat from the ambient air flowing through the ambient air line downstream of the first ambient air compressor to the cabin exhaust air flowing through the cabin exhaust air line upstream of the cabin exhaust air turbine.

11. The method according to claim 10, further comprising a post-heater bypass line, which branches off from the first section of the ambient air line upstream of the post-heater and opens into the first section of the ambient air line again downstream of the post-heater, wherein a post-heater bypass valve is preferably arranged in the post-heater bypass line, which valve controls the ambient air flow through the post-heater bypass line.

12. The method according to claim 8, wherein turbine exhaust air, which flows through a turbine exhaust air line connected to an outlet of the cabin exhaust air turbine, is conducted into the ram air duct.

13. The method according to claim 8, wherein the operation of the cabin exhaust air turbine is controlled in dependence on the flight altitude of an aircraft equipped with the aircraft air conditioning system.

14. The method according to claim 13, wherein the cabin exhaust air turbine is operated when an aircraft equipped with the aircraft air conditioning system is flying at a flight altitude of at least 6000 m.

* * * * *